(12) United States Patent  
Kim et al.

(10) Patent No.: US 11,500,193 B2  
(45) Date of Patent: Nov. 15, 2022

(54) OPTICAL MODULATION DEVICE, METHOD OF OPERATING THE SAME, AND APPARATUS INCLUDING THE OPTICAL MODULATION DEVICE

(71) Applicant: SAMSUNG ELECTRONICS CO., LTD., Suwon-si (KR)

(72) Inventors: Sunil Kim, Hwaseong-si (KR); Byunggil Jeong, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 496 days.

(21) Appl. No.: 16/417,953

(22) Filed: May 21, 2019

(65) Prior Publication Data

US 2020/0142181 A1    May 7, 2020

(30) Foreign Application Priority Data

Nov. 7, 2018 (KR) .................. 10-2018-0136042

(51) Int. Cl.
| | |
|---|---|
| *G02B 26/06* | (2006.01) |
| *G02B 5/08* | (2006.01) |
| *G02F 1/03* | (2006.01) |
| *G01S 17/88* | (2006.01) |

(52) U.S. Cl.
CPC ............ *G02B 26/06* (2013.01); *G02F 1/0311* (2013.01); *G01S 17/88* (2013.01); *G02B 5/0816* (2013.01)

(58) Field of Classification Search
CPC .......... G02F 1/0311; G02F 1/29; G02F 1/292; G02F 1/2955; G02F 2202/30; G02F 2203/24; G02F 2202/36; G02B 26/06; G02B 5/0816; G02B 26/08

See application file for complete search history.

(56) References Cited

U.S. PATENT DOCUMENTS

| | | | |
|---|---|---|---|
| 9,958,707 B2 | 5/2018 | Atwater | |
| 2006/0077533 A1* | 4/2006 | Miles | G02B 26/001 359/321 |
| 2018/0024412 A1 | 1/2018 | Kim et al. | |

(Continued)

FOREIGN PATENT DOCUMENTS

| | | |
|---|---|---|
| EP | 3 451 053 A1 | 3/2019 |
| JP | 2011-180355 A | 9/2011 |

OTHER PUBLICATIONS

Communication dated Jan. 20, 2020 issued by the European Intellectual Property Office in counterpart European Application No. 19178753.0.

*Primary Examiner* — Brandi N Thomas  
(74) *Attorney, Agent, or Firm* — Sughrue Mion, PLLC

(57) ABSTRACT

Provided are an optical modulation device, a method of operating the same, and an apparatus including the optical modulation device. The optical modulation device may include a mirror area, a nano-antenna area, and an active area located between the mirror area and the nano-antenna area, and a plurality of first electrodes and a plurality of second electrodes for changing physical properties of the active area may intersect each other to form a cross-point array structure. The plurality of first electrodes may be included in the mirror area or may be provided separately from the mirror area. The plurality of second electrodes may be included in the nano-antenna area and may be provided separately from the nano-antenna area.

24 Claims, 13 Drawing Sheets

(56) References Cited

U.S. PATENT DOCUMENTS

2018/0059505 A1\* 3/2018 Kyoung ................. G02F 1/292
2018/0136537 A1\* 5/2018 Kim ....................... G02F 1/292
2018/0182457 A1 6/2018 Kau et al.

\* cited by examiner

OPTICAL MODULATION DEVICE, METHOD OF OPERATING THE SAME, AND APPARATUS INCLUDING THE OPTICAL MODULATION DEVICE

CROSS-REFERENCE TO RELATED APPLICATION

This application claims priority from Korean Patent Application No. 10-2018-0136042, filed on Nov. 7, 2018 in the Korean Intellectual Property Office, the disclosure of which is incorporated herein by reference in its entirety.

BACKGROUND

1. Field

The present disclosure relates to optical modulation devices, methods of operating the same, and apparatuses including the optical modulation devices.

2. Description of the Related Art

Optical devices for changing transmission/reflection characteristics, a phase, an amplitude, a polarization state, an intensity, a path, etc. of light are used in various optical apparatuses. Optical modulators having various structures have been proposed to control such properties of light in desired manners in optical systems.

For example, in order to steer a laser to a desired position, a laser emitting portion may be mechanically rotated or an optical phased array (OPA) method may be used to use the interference of a laser bundle. However, when a laser is mechanically steered, a motor or a microelectromechanical system (MEMS) structure has to be used. In this case, the volume of an apparatus is increased and costs are increased. Also, the motor may generate noise and the MEMS structure may vibrate, and thus the utilization of the motor and the MEMS structure is limited. When the OPA method is used, a driving device is required per each pixel or waveguide for electrical or thermal driving purposes, and thus a circuit and a device are complicated, a size is increased, and process costs are increased.

Recently, attempts have been made to apply nano-structures using surface plasmon resonance stimulated by incident light to optical devices.

SUMMARY

Example embodiments address at least the above problems and/or disadvantages and other disadvantages not described above. Also, the example embodiments are not required to overcome the disadvantages described above, and may not overcome any of the problems described above.

One or more example embodiments provide optical modulation devices for non-mechanically modulating light, which may simplify a configuration of a driving circuit unit, may reduce a pixel size, and may increase a field of view (FOV).

Further, one or more example embodiments provide methods of operating the optical modulation devices.

Still further, one or more example embodiments provide optical apparatuses including the optical modulation devices.

Additional aspects will be set forth in part in the description which follows and, in part, will be apparent from the description, or may be learned by practice of the presented embodiments.

According to an aspect of an example embodiment, there is provided an optical modulation device including: a mirror area; a nano-antenna area facing the mirror area; an active area located between the mirror area and the nano-antenna area and having a physical property that varies according to an electrical condition; and a plurality of first electrodes and a plurality of second electrodes configured to change the physical property of the active area located between the plurality of first electrodes and the plurality of second electrodes, the plurality of first electrodes being disposed to intersect the plurality of second electrodes to form a cross-point array structure, wherein the plurality of first electrodes may be included in the mirror area or provided separately from the mirror area, and the plurality of second electrodes may be included in the nano-antenna area or provided separately from the nano-antenna area.

The mirror area may include a plurality of mirror members having linear shapes, as the plurality of first electrodes.

The nano-antenna area may include a plurality of nano-antennas having linear shapes, as the plurality of second electrodes.

The mirror area may include a plurality of mirror members that extend in a first direction, as the plurality of first electrodes, the nano-antenna area may include a plurality of nano-antennas that extend in a second direction intersecting the first direction, as the plurality of second electrodes, and a plurality of intersections between the plurality of mirror members and the plurality of nano-antennas may correspond to a plurality of pixel areas.

The plurality of first electrodes may be provided separately from the mirror area, and the plurality of first electrodes may be located between the mirror area and the active area.

The plurality of second electrodes may be provided separately from the nano-antenna area, and the plurality of second electrodes may be located between the nano-antenna area and the active area.

The optical modulation device may further include: a first insulating layer located between the mirror area and the active area or between the plurality of first electrodes and the active area; and a second insulating layer located between the nano-antenna area and the active area or between the plurality of second electrodes and the active area.

The optical modulation device may further include: a plurality of first driving cells respectively connected to the plurality of first electrodes and configured to apply voltages to the plurality of first electrodes; and a plurality of second driving cells respectively connected to the plurality of second electrodes and configured to apply voltages to the plurality of second electrodes.

The active area may further include a plurality of active layer members having linear shapes that extend in a same direction as a direction in which the plurality of first electrodes or the plurality of second electrodes extend.

The active area may further include an electro-optic material having a permittivity that varies according to an electrical signal applied to the active area.

The active area may further include at least one of a transparent conductive oxide (TCO) and a transition metal nitride (TMN).

The optical modulation device may be configured to induce phase modulation of light reflected by the nano-antenna area.

According to an aspect of another example embodiment, there is provided an optical apparatus including the optical modulation device and configured to steer a beam by using the optical modulation device.

The optical apparatus may further include at least one of a light detection and ranging (LiDAR) apparatus, a three-dimensional (3D) image acquisition apparatus, a 3D sensor, and a depth sensor.

According to an aspect of another example embodiment, there is provided an optical modulation device including: a mirror area; a nano-antenna area facing the mirror area; an active area located between the mirror area and the nano-antenna area and having a physical property that varies according to an electrical condition; and a plurality of electrodes configured to change the physical property of the active area, wherein the active area may include a plurality of active layer members that are arranged to intersect the plurality of electrodes.

The plurality of active layer members may have linear shapes extending in a first direction, and the plurality of electrodes may have linear shapes extending in a second direction that intersects the first direction.

The plurality of electrodes may further include a plurality of first electrodes and a plurality of second electrodes that intersect each other.

The optical modulation device may further include: a first insulating layer located between the mirror area and the active area; and a second insulating layer located between the nano-antenna area and the active area.

The plurality of electrodes may further include a plurality of first electrodes and a plurality of second electrodes that intersect each other, and the optical modulation device may further include: a first insulating layer located between the plurality of first electrodes and the active area; and a second insulating layer located between the plurality of second electrodes and the active area.

According to an aspect of another example embodiment, there is provided a method of operating an optical modulation device including a mirror area, a nano-antenna area, an active area located between the mirror area and the nano-antenna area, a plurality of first electrodes and a plurality of second electrodes configured to change a physical property of the active area located between the plurality of first electrodes and the plurality of second electrodes, the plurality of first electrodes being disposed to intersect the plurality of second electrodes to form a cross-point array structure, a plurality of pixel areas of the active area corresponding to intersections between the plurality of first electrodes and the plurality of second electrodes, the method including: recording phase information of at least one pixel area selected from among the plurality of pixel areas, by using the plurality of first electrodes and the plurality of second electrodes; and modulating a light that is incident on the optical modulation device and reflected by the nano-antenna area.

The recording the phase information may include recording first phase information on a first pixel area at an intersection between a first sub-electrode of the plurality of first electrodes and a first-sub electrode of the plurality of second electrodes by applying a first voltage to the first sub-electrode of the plurality of first electrodes and applying a second voltage to the first sub-electrode of the plurality of second electrodes, wherein the first voltage and the second voltage may have a same polarity.

The recording the first phase information may further include applying a third voltage to a second sub-electrode of the plurality of first electrodes, wherein the third voltage may have a polarity opposite to the polarity of the second voltage.

The recording the first phase information may further include applying a fourth voltage to a second sub-electrode of the plurality of second electrodes, wherein the fourth voltage may have a polarity opposite to the polarity of the first voltage.

The method may further include maintaining a state of at least one pixel area that is not selected from the plurality of pixel areas while recording the phase information of the at least one pixel area selected from the plurality of pixel areas.

The active area may include a plurality of active layer members, wherein the recording the phase information may further include applying a reference voltage to at least one active layer member selected from among the plurality of active layer members, while at least one active layer member that is not selected from among the plurality of active layer members is electrically floated.

The method may further include removing the phase information recorded on the at least one pixel area selected from among the plurality of pixel areas, by using the plurality of first electrodes and the plurality of second electrodes.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1A:
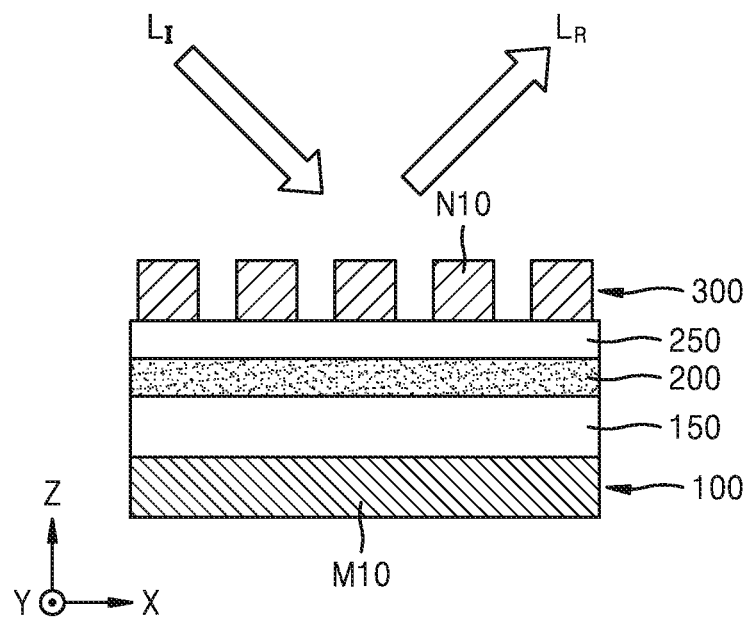
FIG. 1A is a cross-sectional view of an optical modulation device according to an example embodiment.

Various example embodiments will now be described more fully with reference to the accompanying drawings in which example embodiments are shown.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" may encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

As used herein, the term "and/or" includes any and all combinations of one or more of the associated listed items. Expressions such as "at least one of", when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

Hereinafter, an optical modulation device, a method of operating the same, and an apparatus including the optical modulation device according to embodiments will be described with reference to the accompanying drawings. Widths and thicknesses of layers or areas shown in the drawings may be exaggerated for clarity and convenience of explanation. The same reference numerals denote the same elements in the detailed description.

Figure 1B:
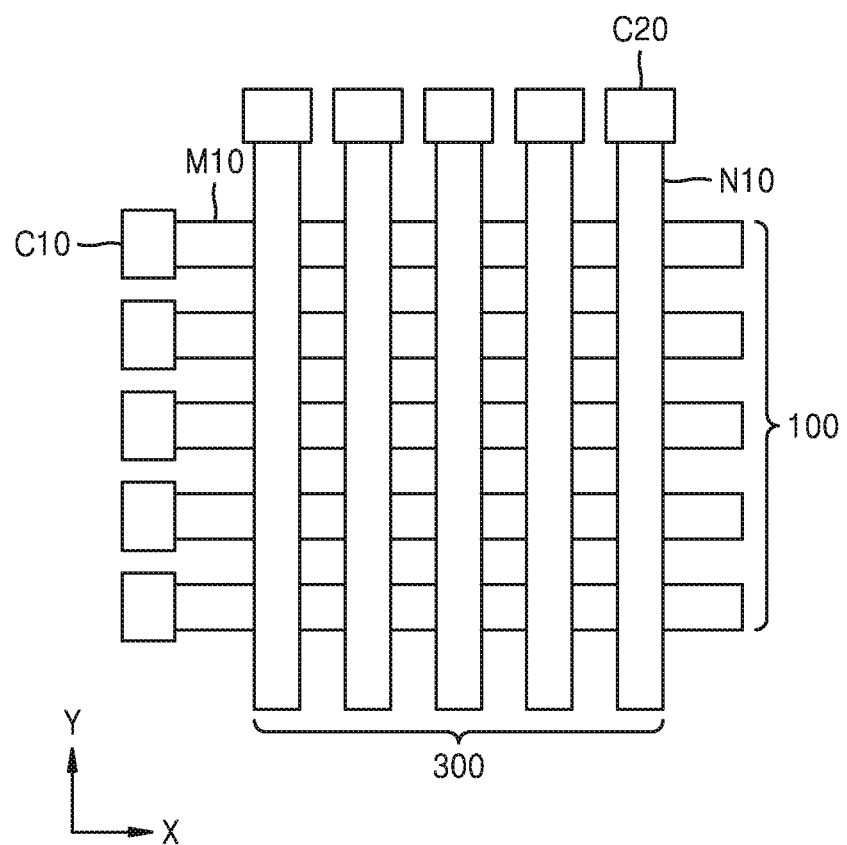
FIG. 1B is a plan view illustrating a planar structure of main elements of the optical modulation device of FIG. 1A.

FIG. 1A is a cross-sectional view of an optical modulation device according to an example embodiment. FIG. 1B is a plan view illustrating a planar structure of main elements of the optical modulation device of FIG. 1A.

Referring to FIGS. 1A and 1B, an optical modulation device may include a mirror area 100, and a nano-antenna area 300 facing the mirror area 100. The mirror area 100 may include a plurality of mirror members M10 that have linear shapes and extend in a first direction, for example, an X-axis direction. The nano-antenna area 300 may include a plurality of nano-antennas N10 that have linear shapes and extend in a second direction, for example, a Y-axis direction, intersecting the first direction. An active area (hereinafter, referred to as 'active layer') 200 whose physical properties vary according to an electrical condition may be provided between the mirror area 100 and the nano-antenna area 300.

Also, a first insulating layer 150 may be provided between the mirror area 100 and the active layer 200, and a second insulating layer 250 may be provided between the active layer 200 and the nano-antenna area 300.

'A plurality of first electrodes' and 'a plurality of second electrodes' for changing the physical properties of the active layer 200 may be provided. In the present embodiment, the plurality of mirror members M10 may be used as the plurality of first electrodes, and the plurality of nano-antennas N10 may be used as the plurality of second electrodes. The plurality of first electrodes (i.e., the plurality of mirror members M10) and the plurality of second electrodes (i.e., the plurality of nano-antennas N10) may intersect each other with the active layer 200 therebetween to form a cross-point array structure. A plurality of intersections between the plurality of mirror members M10 and the plurality of nano-antennas N10 may correspond to a plurality of pixel areas. The plurality of pixel areas may be arranged two-dimensionally.

The plurality of mirror members M10 may be back reflector electrodes located under the active layer 200. That is, the mirror members M10 may reflect light and may function as electrodes. The mirror members M10 may be optically coupled to the nano-antennas N10, and light may be reflected by an optical interaction between the nano-antennas N10 and the mirror members M10. Each of the mirror members M10 may be formed of a predetermined conductor such as a metal. For example, the mirror member M10 may include at least one metal selected from the group consisting of copper (Cu), aluminum (Al), nickel (Ni), iron (Fe), cobalt (Co), zinc (Zn), titanium (Ti), ruthenium (Ru), rhodium (Rh), palladium (Pd), platinum (Pt), argon (Ag), osmium (Os), iridium (Ir), gold (Au), and molybdenum (Mo), or may include an alloy including at least one of the metals. Alternatively, the mirror member M10 may include a thin film in which metal nano-particles Au or Ag are dispersed, a carbon nano-structure such as graphene or carbon nanotubes (CNTs), a conductive polymer such as poly(3,4-ethylenedioxythiophene) (PEDOT), polypyrrole (PPy), or poly(3-hexylthiophene) (P3HT), or a conductive oxide.

The nano-antenna N10 may be an antenna having a nano-structure and configured to capture energy by converting light of a specific wavelength (or frequency) having a predetermined wavelength (or frequency) into localized surface plasmon resonant light. The light incident on the nano-antenna N10 may include both visible and invisible electromagnetic waves. The nano-antenna N10 may have a conductive layer pattern (e.g., a metal layer pattern), and the conductive layer pattern may contact a non-conductive layer (e.g., a dielectric layer). Plasmon resonance may occur at an interface between the conductive layer pattern and the non-conductive layer (e.g., the dielectric layer). In this case, the non-conductive layer (e.g., the dielectric layer) may be the second insulating layer 250, or a layer different from the second insulating layer 250. For convenience, the following will be described on the assumption that the conductive layer pattern is the nano-antenna N10. An interface at which surface plasmon resonance occurs, such as the interface between the conductive layer pattern and the non-conductive layer (e.g., the dielectric layer), may be referred to as a "meta surface" or a "meta structure".

The nano-antenna N10 may be formed of a conductive material and may have a sub-wavelength dimension. The term 'sub-wavelength dimension' refers to a dimension smaller than an operating wavelength or a resonance wavelength of the nano-antenna N10. At least one shape dimension from among a thickness and a width of the nano-antenna N10, and an interval between adjacent nano-antennas N10 may be a sub-wavelength dimension. The resonance wavelength may vary according to a shape or a dimension of the nano-antenna N10.

A conductive material used to form the nano-antenna N10 may be a metal material having high conductivity and capable of causing surface plasmon excitation. For example, the nano-antenna N10 may be formed of at least one metal selected from the group consisting of Cu, Al, Ni, Fe, Co, Zn, Ti, Ru, Rh, Pd, Pt, Ag, Os, Ir, Au, and Mo, or an alloy including at least one of the metals. Alternatively, the nano-antenna N10 may include a thin film in which metal nano-particles such as Au or Ag are dispersed, a carbon nano-structure such as graphene or CNTs, a conductive polymer such as PEDOT, PPy, or P3HT, or a conductive oxide.

The active layer 200 may be a layer whose physical properties vary according to an electrical condition. A permittivity or a refractive index of the active layer 200 may be changed according to an electrical condition of the active layer 200 and a region around the active layer 200. The change in the permittivity or the refractive index of the active layer 200 may be attributable to a change in a charge concentration (charge density) of a region (regions) in the active layer 200. In other words, the permittivity or the refractive index of the active layer 200 may be changed by the change in the charge concentration of the region (regions) in the active layer 200. The active layer 200 may be referred to as a refractive index-varying layer. The permittivity or the refractive index of the active layer 200 may be changed according to an electrical field or a voltage applied to the active layer 200. The active layer 200 may include a transparent conductive oxide (TCO) such as indium tin oxide (ITO), indium zinc oxide (IZO), aluminum zinc oxide (AZO), gallium zinc oxide (GZO), aluminum gallium zinc oxide (AGZO), or gallium indium zinc oxide (GIZO). Alternatively, the active layer 200 may include a transition metal nitride (TMN) such as TiN, ZrN, HfN, or TaN. In addition, the active layer 200 may include an electro-optic (EO) material having an effective permittivity that is changed when an electrical signal is applied to the active layer 200. The EO material may include a crystalline material such as $LiNbO_3$, $LiTaO_3$, potassium tantalate niobate (KTN), or lead zirconate titanate (PZT), or various polymers having EO characteristics. The active layer 200 may be a conductor or a semiconductor.

Each of the first insulating layer 150 and the second insulating layer 250 may include an insulating material (e.g., a dielectric material). Each of the first and second insulating layers 150 and 250 may have an electrical resistance of about 1 MΩ or more. At least one of the first and second insulating layers 150 and 250 may include at least one of an insulating silicon compound and an insulating metal compound. Examples of the insulating silicon compound may include silicon oxide (SiOx), silicon nitride (SixNy), and silicon oxynitride (SiON), and examples of the insulating metal compound may include aluminum oxide ($Al_2O_3$), hafnium oxide (HfO), zirconium oxide (ZrO), and hafnium silicon oxide (HfSiO). The above detailed materials of the first and second insulating layers 150 and 250 are merely examples and the present embodiment is not limited thereto. The first insulating layer 150 and the second insulating layer 250 may be formed of the same material or different materials.

The active layer 200 may be electrically separated or insulated from the plurality of mirror members M10 by the first insulating layer 150, and the active layer 200 may be electrically separated or insulated from the plurality of nano-antennas N10 by the second insulating layer 250. Physical properties (e.g., a refractive index) of the active layer 200 may vary according to a voltage applied between the plurality of mirror members M10 and the active layer 200 and/or a voltage applied between the plurality of nano-antennas N10 and the active layer 200. When predetermined incident light $L_I$ is reflected by the nano-antennas N10, characteristics (e.g., a direction) of reflected light $L_R$ may vary according to the physical properties of the active layer 200. When the physical properties of the active layer 200 are changed by using a voltage applied to the plurality of mirror members M10 and a voltage applied to the plurality of nano-antennas N10, optical modulation characteristics may be improved and noise or the like may be reduced. The mirror members M10, the first insulating layer 150, and the active layer 200 may constitute a metal oxide semiconductor (MOS) structure or the like. Also, the nano-antennas N10, the second insulating layer 250, and the active layer 200 may constitute a MOS structure or the like.

A plurality of areas of the active layer 200 corresponding to a plurality of pixel areas defined at intersections between the plurality of mirror members M10 and the plurality of nano-antennas N10 may be independently controlled, by using the plurality of mirror members M10 as first electrodes and the plurality of nano-antennas N10 as second electrodes intersecting the first electrodes. Phase modulation of light generated by the plurality of pixel areas may be controlled. A direction of a beam emitted from each of the plurality of pixel areas may be steered by appropriately controlling phase modulation of light generated by the plurality of pixel areas. For example, when phase modulation of light generated by the plurality of pixel areas arranged in a first direction is controlled to be sequentially reduced by π/2 in the first direction, a direction of light reflected by the plurality of pixel areas may be controlled (steered) to a specific direction, which may be referred to as beam steering of an optical phased array method. A steering direction of light may be adjusted in various ways by adjusting a phase shift rule of a phased array.

In addition, as shown in FIG. 1B, a plurality of first driving cells C10 respectively connected to the plurality of first electrodes (i.e., the plurality of mirror members M10) and configured to apply voltages may be further provided. Also, a plurality of second driving cells C20 respectively connected to the plurality of second electrodes (i.e., the plurality of nano-antennas N10) and configured to apply voltages may be further provided. The plurality of mirror members M10 and the plurality of nano-antennas N10 may be driven by using the plurality of first driving cells C10 and the plurality of second driving cells C20.

For example, a pixel area that is located at the intersection between a mirror member in the first row of the plurality of mirror members M10 and a nano-antenna in the first column of the plurality of nano-antennas N10, is controlled by a first driving cell C10 connected to the mirror member in the first row, and a second driving cell C10 connected to the nano-antenna in the first column. In this manner, when twenty five (25) pixel areas exist at the intersections between five (5) mirror members M10 and five (5) nano-antennas N10 as shown in FIG. 1B, the twenty five (25) pixel areas may be individually controlled by using a less number of driving cells C10 and M10 (e.g., five (5) first driving cells C10 and five (5) second driving cells C20) than the number of the pixel areas (e.g., twenty five (25) pixel areas).

Although not shown in FIG. 1B, the active layer 200 may be a plate-type active layer covering the plurality of pixel areas. Alternatively, the active layer 200 may have a structure patterned into a predetermined shape.

Figure 2A:
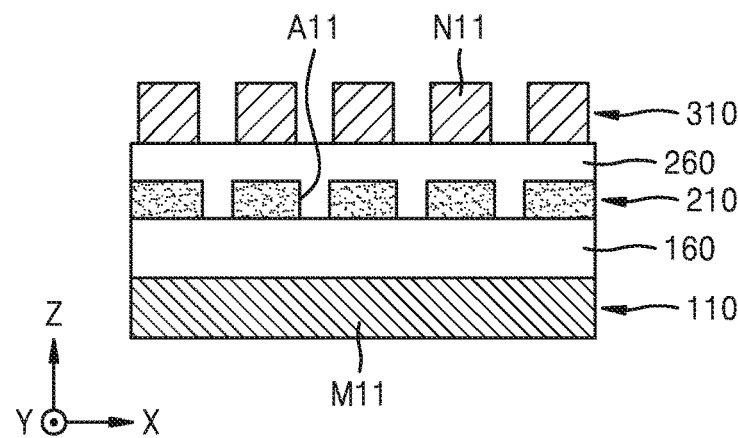
FIG. 2A is a cross-sectional view of an optical modulation device according to another example embodiment.
Figure 2B:
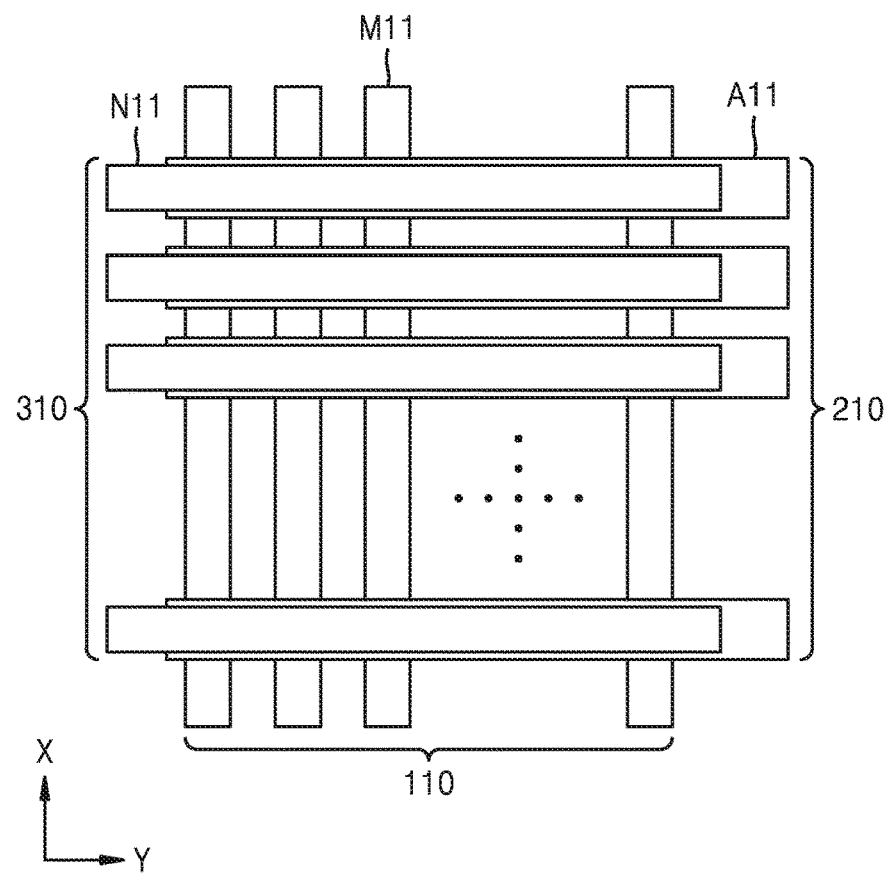
FIG. 2B is a plan view illustrating a planar structure of main elements of the optical modulation device of FIG. 2A.

FIG. 2A is a cross-sectional view of an optical modulation device according to another example embodiment. FIG. 2B is a plan view illustrating a planar structure of main elements of the optical modulation device of FIG. 2A.

Referring to FIGS. 2A and 2B, an optical modulation device may include a mirror area 110 including a plurality of mirror members M11, and a nano-antenna area 310 including a plurality of nano-antennas N11 and facing the mirror area 110. An active area (hereinafter, referred to as 'active layer') 210 may be provided between the mirror area 110 and the nano-antenna area 310. The active layer 210 may have a structure patterned into a predetermined shape. For example, the active layer 210 may include a plurality of active layer members A11 having linear shapes. The plurality of active layer members A11 may be spaced apart from one another and may extend in a predetermined direction to be parallel to one another. The active layer 210 may be patterned into linear pattern shapes including the plurality of active layer layers A11. The plurality of active layer members A11 may extend in the same direction as a direction in which the plurality of mirror members M11 (i.e., a plurality of first electrodes) or the plurality of nano-antennas N11 (i.e., a plurality of second electrodes) extend. In FIGS. 2A and 2B, the plurality of active layer members A11 extend in the same direction as a direction in which the plurality of nano-antennas N11 (i.e., the plurality of second electrodes) extend.

In FIG. 2A, reference numeral 160 denotes a first insulating layer, and reference numeral 260 denotes a second insulating layer. A plurality of first driving cells C10 and a plurality of second driving cells C20 illustrated in FIG. 1B may be respectively connected to the plurality of mirror members M11 and the plurality of nano-antennas N10 illustrated in FIG. 2A. The optical modulation device may further include a plurality of third driving cells that are respectively connected to the plurality of active layer members A11.

Figure 3:
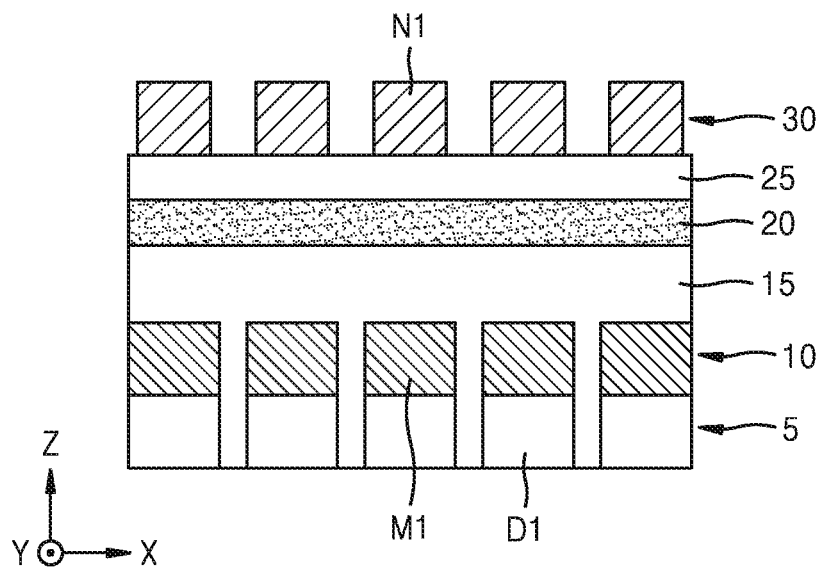
FIG. 3 is a cross-sectional view of an optical modulation device according to a comparative example.

FIG. 3 is a cross-sectional view of an optical modulation device according to a comparative example.

Referring to FIG. 3, the optical modulation device according to the comparative example includes a mirror array 10 including a plurality of mirror elements M1 and a nano-antenna array 30 including a plurality of nano-antennas N1 and facing the mirror array 10. The plurality of mirror elements M1 are arranged to correspond to a plurality of pixel areas in a one-to-one correspondence manner, and the plurality of nano-antennas N1 are arranged to correspond to the plurality of pixel areas in a one-to-one correspondence manner. A driving device unit 5 including a plurality of pixel drivers D1 respectively connected to the plurality of mirror elements M1 is provided. The plurality of pixel drivers D1 are arranged to correspond to the plurality of pixel areas in a one-to-one correspondence manner. Each of the plurality of pixel drivers D1 may include a transistor and a capacitor. Although not shown in FIG. 3, the plurality of pixel drivers D1 may also be connected to the plurality of nano-antennas N1. Reference numeral 15 denotes a first insulating layer, reference numeral 20 denotes an active layer, and reference numeral 25 denotes a second insulating layer.

A plurality of areas of the active layer 20 corresponding to the plurality of pixel areas may be differently controlled by independently applying different voltages to the plurality of mirror elements M1 by using the plurality of pixel drivers D1 and independently applying different voltages to the plurality of nano-antennas N1, and as a result, beam steering characteristics due to a phase profile may be achieved. However, in the comparative example, since different voltages have to be applied to pixels, a driving circuit and a device structure are complicated. Also, in order to two-dimensionally steer a beam, a driver (i.e., D1) is required for each pixel, and as a result, a pixel size is increased and a field of view (FOV) is reduced.

Figure 4:
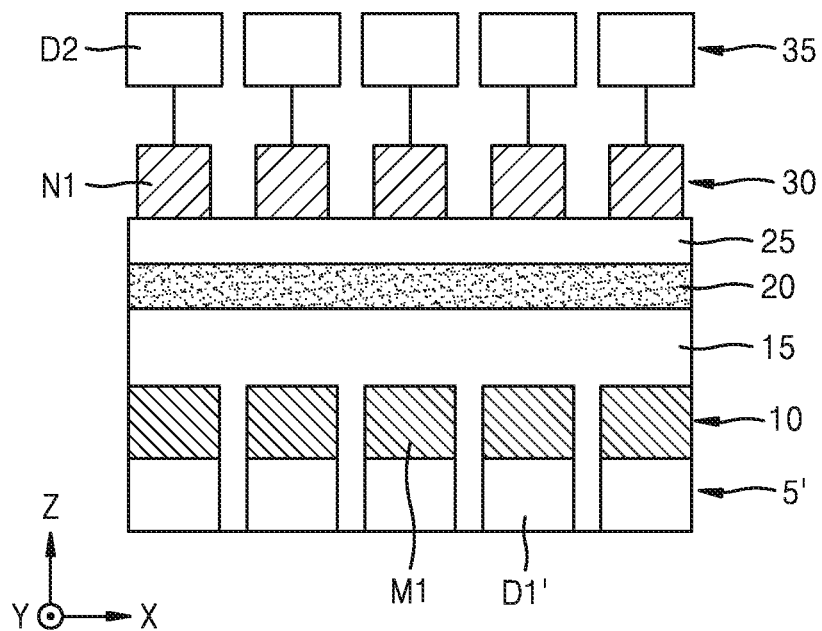
FIG. 4 is a cross-sectional view of an optical modulation device according to another comparative example.

FIG. 4 is a cross-sectional view of an optical modulation device according to another comparative example.

Referring to FIG. 4, in the present comparative example, a first driving device unit 5' including a plurality of first drivers D1' respectively connected to the plurality of mirror elements M1 is provided, and a second driving device unit 35 including a plurality of second drivers D2 respectively connected to the plurality of nano-antennas N1 is provided. Different voltages may be applied to the plurality of mirror elements M1 by the plurality of first drivers D1', and different voltages may be applied to the plurality of nano-antennas N1 by the plurality of second drivers D2. In this comparative example, since a driver (i.e., D1' or D2) is required for each pixel, a driving circuit and a device structure are complicated, a pixel size is increased, and an FOV is reduced.

According to the comparative examples of FIGS. 3 and 4, a plurality of drivers respectively corresponding to a plurality of pixel areas have to be two-dimensionally arrayed. However, according to an embodiment of the present disclosure, a driver is not required for each pixel, and only the first and second driving cells C10 and C20 (see FIG. 1B) respectively connected to the plurality of mirror members (first electrodes) M10 and the plurality of nano-antennas (second electrodes) N10 need to be provided. The first and second driving cells C10 and C20 are located at end portions of electrode lines (i.e., the mirror members M10 and the nano-antennas N10). Accordingly, according to the embodiment, a configuration of an optical modulation device may be simplified, a pixel size may be greatly reduced, and an FOV corresponding to a steering angle may be increased. Also, since a fill factor is increased due to a simple structure, conversion efficiency may be improved and beam loss may be reduced. The term 'fill factor' used herein may refer to a ratio of an effective pixel area to a predetermined unit area. Due to a simple structure, a fill factor may be increased and conversion efficiency may be improved. Also, due to a simple cross-point structure, a 2D device may be easily realized.

Figure 5:
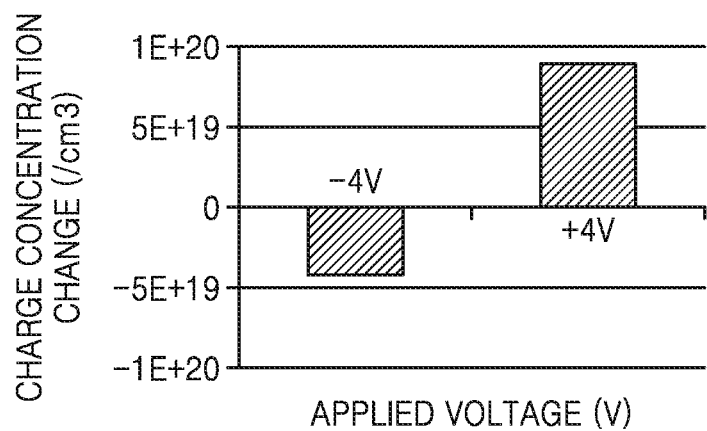
FIG. 5 is a graph illustrating a relationship between a voltage applied to electrodes of an optical modulation device and a charge concentration change of an active layer area, according to an example embodiment.

FIG. 5 is a graph illustrating a relationship between a voltage applied to electrodes of an optical modulation device and a charge concentration change of an active layer area, according to an example embodiment. FIG. 5 illustrates, when a voltage is applied to one of the plurality of mirror members (first electrodes) M10 and one of the plurality of nano-antennas (second electrodes) N10 in the structure of FIGS. 1A and 1B, a charge concentration change amount of an area of the active layer 200 corresponding to an intersection between the mirror member M10 and the nano-antenna N10.

Referring to FIG. 5, when a positive voltage (e.g., +4V) is applied to each of the mirror member (first electrode) and the nano-antenna (second electrode), a charge concentration of an active layer area corresponding to an intersection between the mirror member and the nano-antenna is increased. When a negative voltage (e.g., −4V) is applied to each of the mirror member (first electrode) and the nano-antenna (second electrode), a charge concentration of the active layer area corresponding to the intersection between the mirror member and the nano-antenna is reduced. When voltages having the same polarity are simultaneously applied to the mirror member (first electrode) and the nano-antenna (second electrode), a charge concentration of the active layer area (pixel area) is increased or reduced according to the polarity of the voltages.

When voltages having opposite polarities are simultaneously applied to the mirror member (first electrode) and the nano-antenna (second electrode), a charge concentration change amount of the active layer area (pixel area) corresponding to the intersection between the mirror member and the nano-antenna is greatly reduced or a charge concentration is not substantially changed.

Phase change characteristics with respect to incident light (e.g., a laser beam) applied from the outside may vary according to a charge concentration (a carrier concentration) of an active layer area (pixel area). Accordingly, by controlling the charge concentration of the active layer area, a phase change of light in a pixel area corresponding to the active layer area may be controlled. In this regard, the charge concentration or a charge distribution of the active layer area may be referred to as "phase information". When the charge concentration of the active layer area (pixel area) is changed by applying a voltage to upper and lower electrodes (i.e., mirror members and nano-antennas) of the active layer area (pixel area), even if the applied voltage is removed, the changed charge concentration may be maintained due to upper and lower insulating layers. In other words, phase information recorded on the active layer area (pixel area) may be maintained even if a voltage (bias voltage) applied to record the phase information is removed, which may be referred to as memory characteristics or optic memory characteristics.

Figure 6:
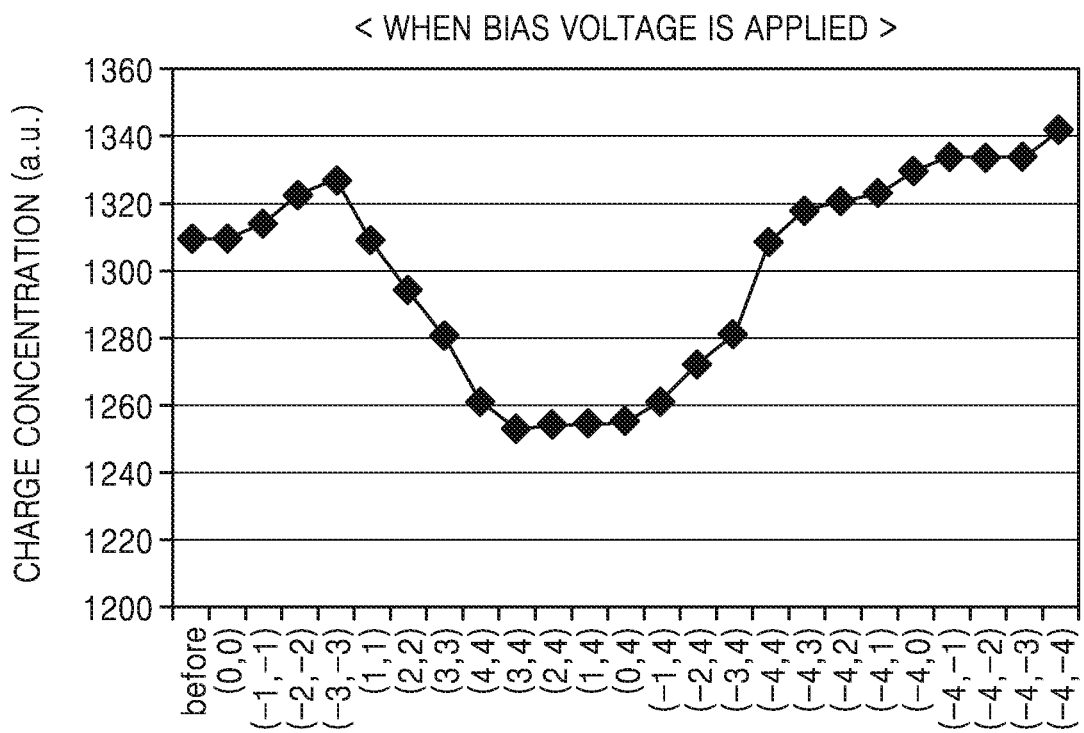
FIG. 6 is a graph illustrating a relationship between a bias voltage applied to first and second electrodes of an optical modulation device and a charge concentration of an active layer area, according to an example embodiment.

FIG. 6 is a graph illustrating a relationship between a bias voltage applied to first and second electrodes of an optical modulation device and a charge concentration of an active layer area, according to an example embodiment.

Figure 7:
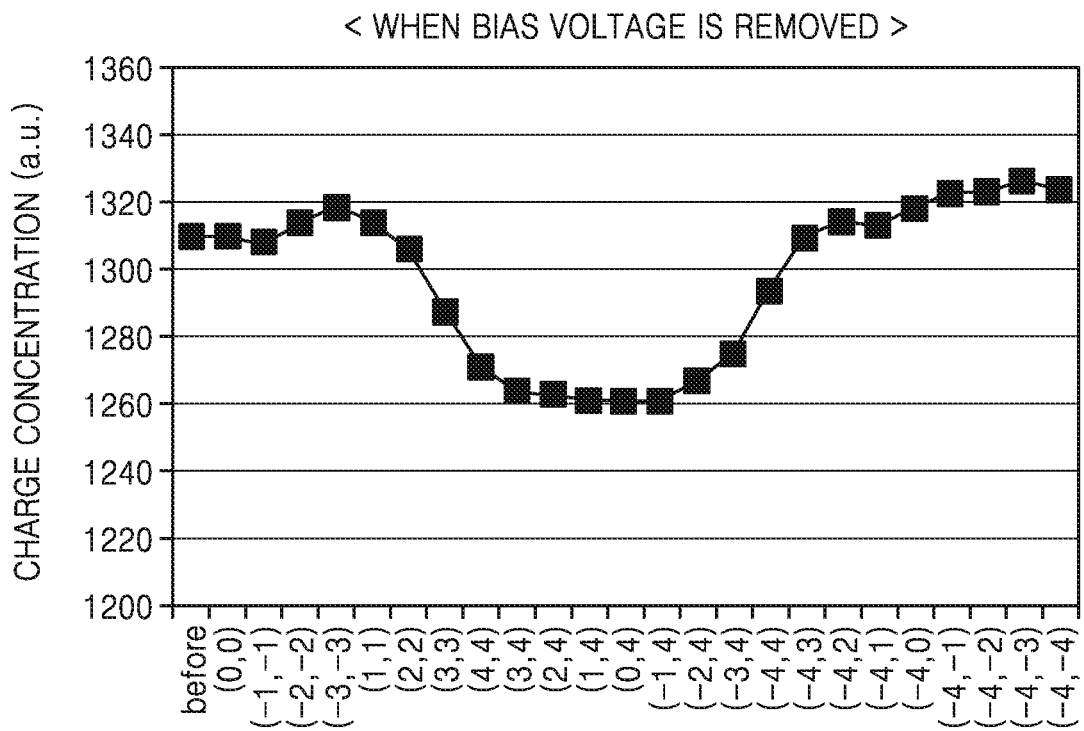
FIG. 7 is a graph illustrating a charge concentration of the active layer area after the bias voltage applied in FIG. 6 is removed.

FIG. 7 is a graph illustrating a charge concentration of the active layer area after the bias voltage applied in FIG. 6 is removed.

Referring to FIGS. 6 and 7, a charge concentration (i.e., phase information) of an active layer area may vary in various ways according to a bias voltage applied to first and second electrodes, and even when the applied bias voltage is removed, the changed charge concentration (i.e., phase information) may be maintained. Accordingly, a voltage does not need to be continuously applied in order to maintain phase information (a phase profile), and a circuit such as a transistor or a capacitor does not need to be provided for each pixel.

Figure 8:
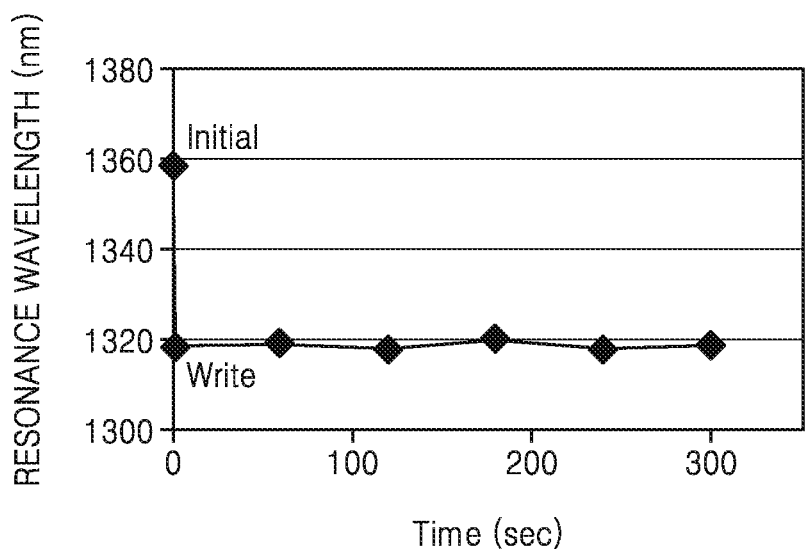
FIG. 8 is a graph illustrating a state change over time, after a write operation is performed on a pixel area of an optical modulation device according to an example embodiment.

FIG. 8 is a graph illustrating a state change over time, after a write operation is performed on a pixel area of an optical modulation device according to an example embodiment.

Referring to FIG. 8, when data is written under a predetermined voltage condition to a pixel area in an initial state, even if time passes, the written data may be maintained. A resonance wavelength (optical characteristics) in an initial state may be changed according to an applied voltage condition, and even if an applied voltage is removed, the changed resonance wavelength (optical characteristics) may be maintained.

Figure 9:
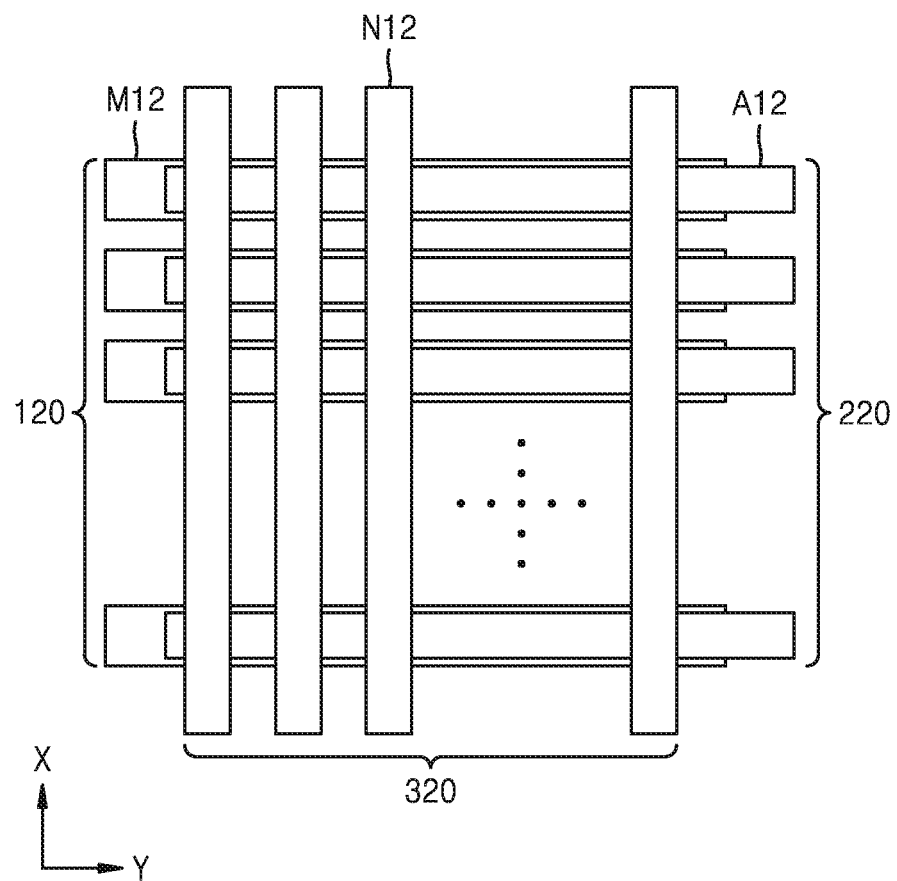
FIG. 9 is a plan view illustrating a planar structure of man elements of an optical modulation device according to another example embodiment.

Although the plurality of active layer members A11 intersect the plurality of mirror members M11 (i.e., a plurality of first electrodes) in FIGS. 2A and 2B, according to another example embodiment, the plurality of active layer members A11 may intersect the plurality of nano-antennas N11 (i.e., a plurality of second electrodes), instead of the plurality of mirror members M11 (i.e., the plurality of first electrodes), as illustrated in FIG. 9.

FIG. 9 is a plan view illustrating a planar structure of main elements of an optical modulation device according to another example embodiment.

Referring to FIG. 9, an optical modulation device may include a mirror area 120 including a plurality of mirror members M12, and a nano-antenna area 320 including a plurality of nano-antennas N12 and facing the mirror area 120. An active area (hereinafter, referred to as 'active layer') 220 may be provided between the mirror area 120 and the nano-antenna area 320. The active layer 220 may include a plurality of active layer members A12 having linear shapes. The plurality of active layer members A12 may be arranged to intersect the plurality of nano-antennas N12 (i.e., a plurality of second electrodes). The plurality of active layer members A12 may extend in the same direction as a direction in which the plurality of mirror members M12 (i.e., a plurality of first electrodes) extend. However, extension directions of the mirror members M12, the nano-antennas N12, and the active layer members A12 illustrated in FIG. 9 are merely examples, and may be changed. If necessary, the active layer members A12 may intersect both the mirror members M12 and the nano-antennas N12.

Figure 10:
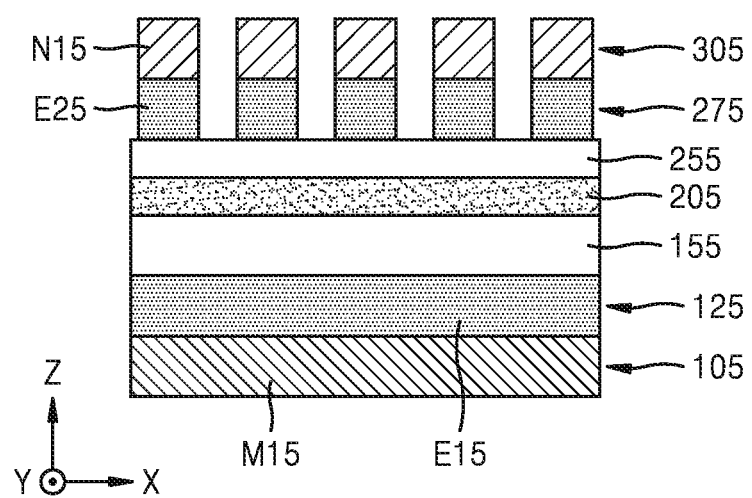
FIG. 10 is a cross-sectional view of an optical modulation device according to another example embodiment.

Although the plurality of mirror members M10 and M11 are used as the plurality of first electrodes and the plurality of nano-antennas N10 and N11 are used as the plurality of second electrodes in FIGS. 1A through 2B, according to another embodiment, a plurality of first electrode lines provided separately from the plurality of mirror members M10 and M11 may be used, and/or a plurality of second electrode lines provided separately from the plurality of nano-antennas N10 and N11 may be used, as illustrated in FIG. 10.

FIG. 10 is a cross-sectional view of an optical modulation device according to another example embodiment.

Referring to FIG. 10, an optical modulation device may include a mirror area 105 including a plurality of mirror members M15, and a nano-antenna area 305 including a plurality of nano-antennas N15 and facing the mirror area 105. Although one mirror member M15 is illustrated in FIG. 10, the plurality of mirror members M15 may be spaced apart from one another in a Y-axis direction. An active area (hereinafter, referred to as 'active layer') 205 may be provided between the mirror area 105 and the nano-antenna area 305. A first insulating layer 155 may be provided between the mirror area 105 and the active layer 205, and a second insulating layer 255 may be provided between the active layer 205 and the nano-antenna area 305.

In the present embodiment, a first electrode array 125 including a plurality of first electrodes E15 may be provided between the mirror area 105 and the first insulating layer 155. Although one first electrode E15 is illustrated in FIG. 10, the plurality of first electrodes E15 may be spaced apart from one another in the Y-axis direction. Also, a second electrode array 275 including a plurality of second electrodes E25 may be provided between the second insulating layer 255 and the nano-antenna area 305.

The plurality of mirror members M15 and the plurality of first electrodes E15 may have a planar structure that is the same as or similar to that of the plurality of mirror members M10 of FIG. 1B. The plurality of the first electrodes E15 may be stacked on the plurality of mirror members M15 to form one pattern shape. The plurality of nano-antennas N15 and the plurality of second electrodes E25 may have a planar structure that is the same as or similar to that of the plurality of nano-antennas N10 of FIG. 1B. The plurality of nano-antennas N15 may be stacked on the plurality of second electrodes E25 to form one pattern shape. The plurality of first electrodes E15 and the plurality of second electrodes E25 may be transparent electrodes, and in this case, light loss of the optical modulation device may be reduced. However, if necessary, the plurality of first electrodes E15 and the plurality of second electrodes E25 may not be transparent electrodes.

Alternatively, one of the plurality of first electrodes E15 and the plurality of second electrodes E25 may not be used. For example, the plurality of first electrodes E15 may not be used, and the plurality of mirror members M10 may be used as first electrodes. The plurality of second electrodes E25 may not be used, and the plurality of nano-antennas N15 may be used as second electrodes. Also, in FIG. 10, the active layer 205 may be patterned to include a plurality of active layer members having linear shapes in FIG. 10, like the active layer 210 of FIG. 2B.

A method of operating an optical modulation device according to an embodiment may include a step of recording phase information on at least one pixel area selected from among a plurality of pixel areas by using a plurality of first electrodes and a plurality of second electrodes and a step of modulating light incident on the optical modulation device. Also, the method of operating the optical modulation device may further include a step of removing the phase information recorded on the at least one pixel area selected from among the plurality of pixel areas by using the plurality of first electrodes and the plurality of second electrodes.

Figure 11:
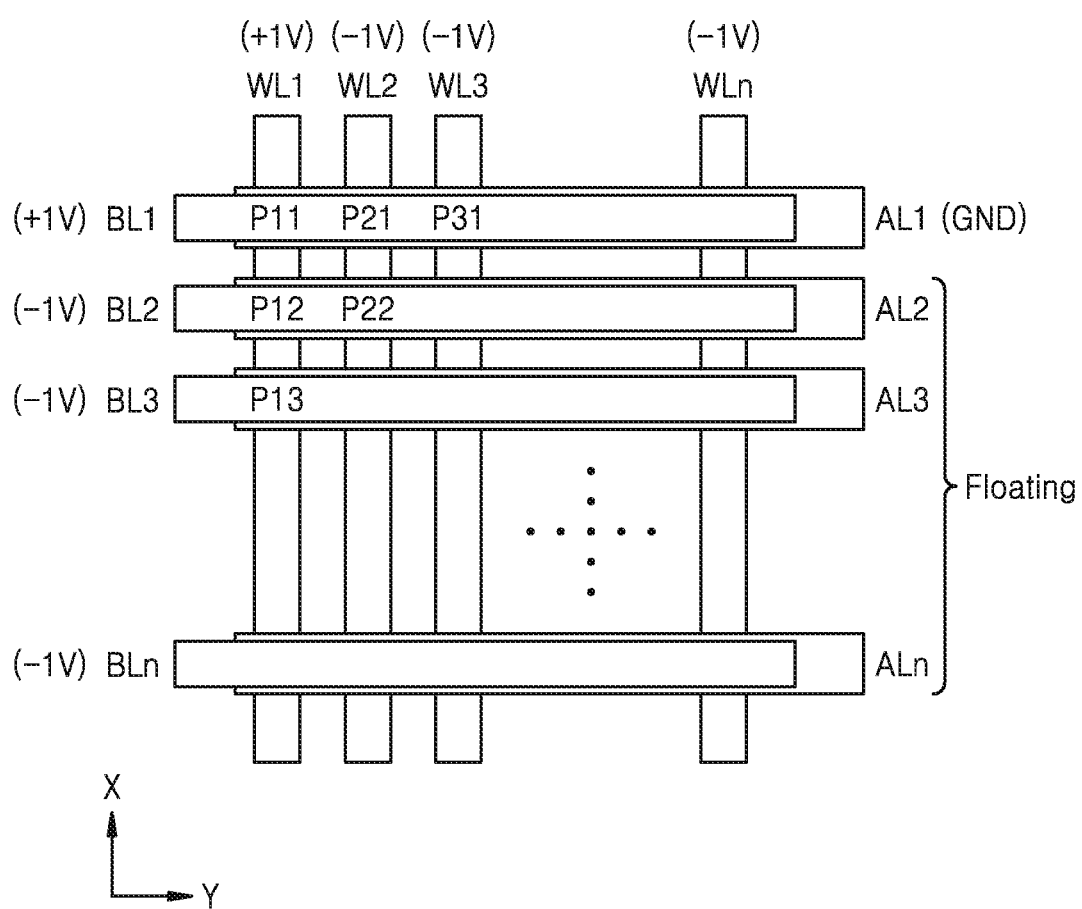
FIGS. 11 through 13 are plan views for describing a method of operating an optical modulation device according to an example embodiment.
Figure 12:
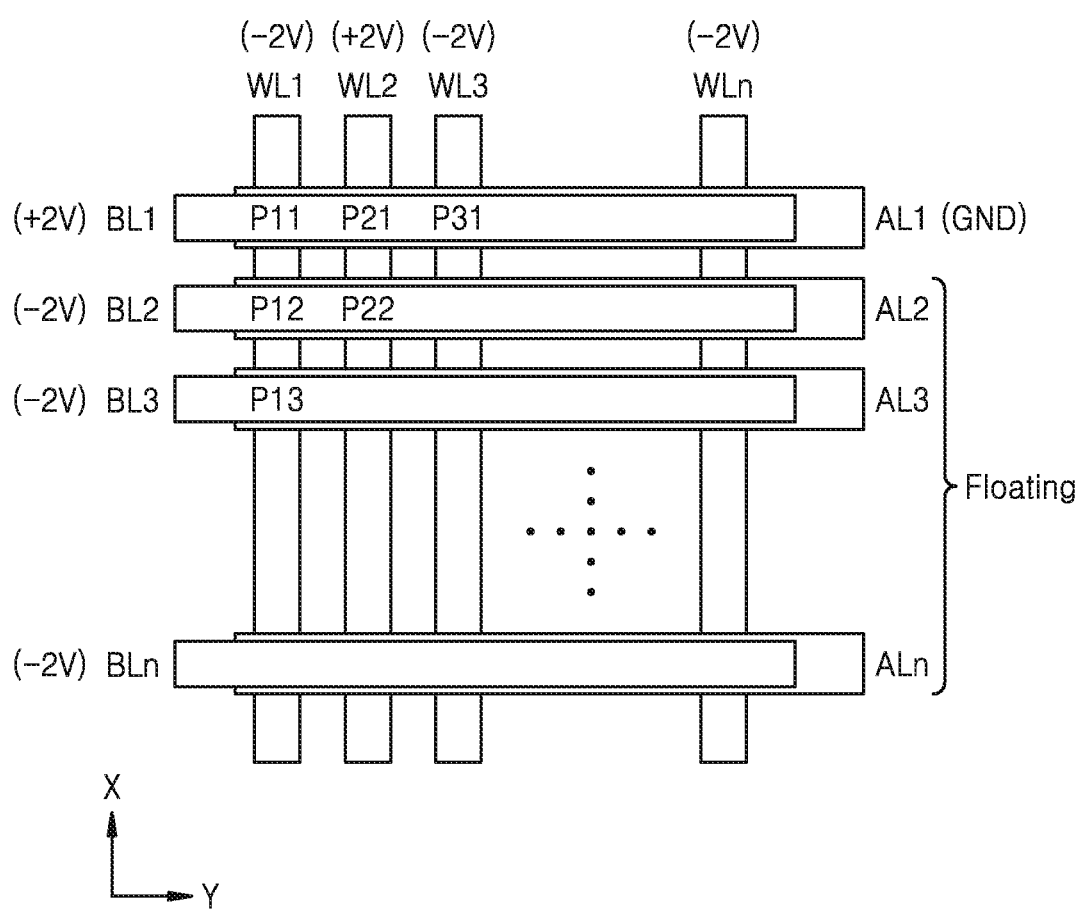
Figure 13:
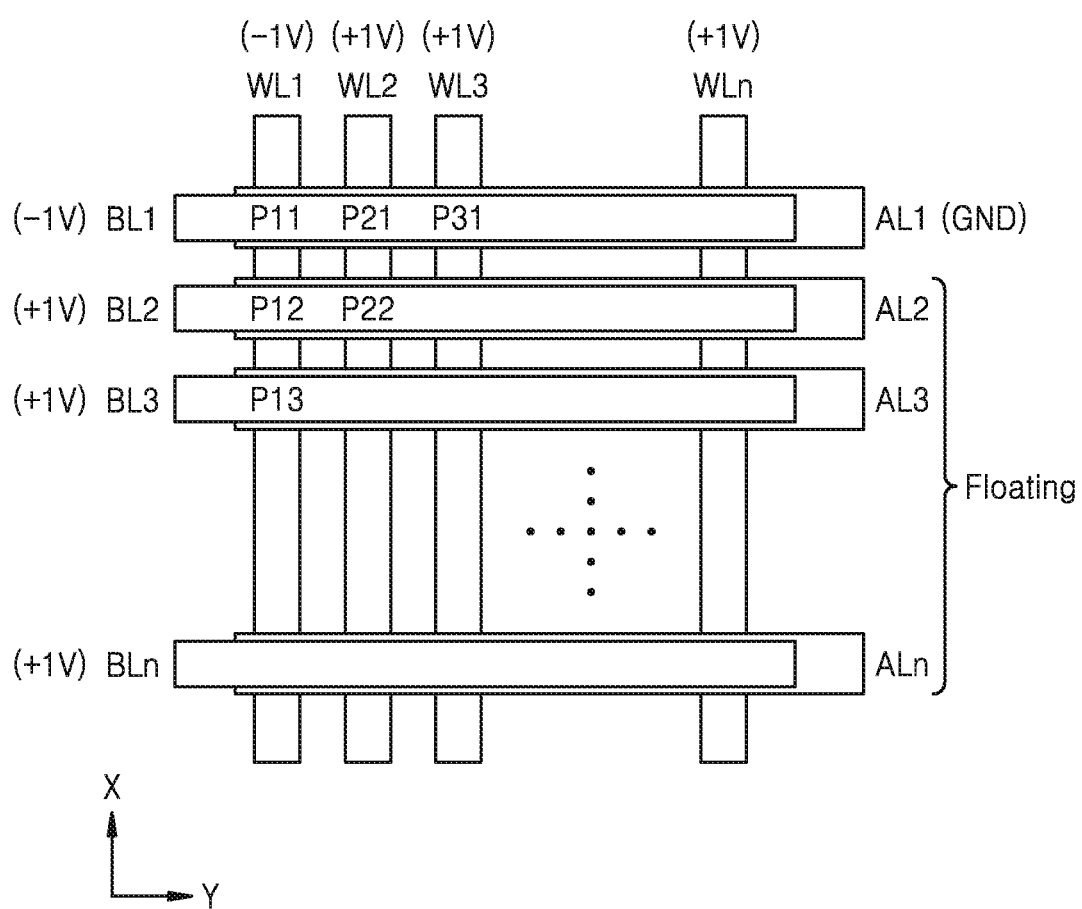

An operation of an optical modulation device according to an example embodiment will now be described with reference to FIGS. 11 through 13. FIGS. 11 and 12 illustrate a method of recording phase information, and FIG. 13 illustrates a method of removing the phase information.

FIG. 11 is a plan view for describing a method of operating an optical modulation device according to an example embodiment.

Referring to FIG. 11, a plurality of first electrodes WL1 through WLn may be provided, a plurality of second electrodes BL1 through BLn intersecting the plurality of first electrodes WL1 through WLn may be provided, and a plurality of active layer members AL1 through ALn may be provided between the plurality of first electrodes WL1 through WLn and the plurality of second electrodes BL1 through BLn. The plurality of first electrodes WL1 through WLn, the plurality of second electrodes BL1 through BLn, and the plurality of active layer members AL1 through ALn may respectively correspond to the plurality of mirror members M11, the plurality of nano-antennas N11, and the plurality of active layer members A11 of FIG. 2B. The plurality of first electrodes WL1 through WLn may be word lines and the plurality of second electrodes BL1 through BLn may be bit lines, or vice versa. Intersections between the plurality of first electrodes WL1 through WLn and the plurality of second electrodes BL1 through BLn may correspond to a plurality of pixel areas P11, P21, P31, P12, P13, P22, . . . , and Pnn.

A method of recording first phase information on the first pixel area P11 from among the plurality of pixel areas P11, P21, P31, P12, P13, P22, . . . , and Pnn is as follows.

In this example embodiment, the plurality of first electrodes WL1 through WLn may be also referred to as $1\text{-}1^{th}$ electrode, $1\text{-}2^{th}$ electrode, $1\text{-}3^{th}$ electrode, . . . , and $1\text{-}n^{th}$ electrode, and the plurality of second electrodes BL1 through BLn may be also referred to as $2\text{-}1^{th}$ electrode, $2\text{-}2^{th}$ electrode, 2-3$^{th}$ electrode, . . . , and 2-n$^{th}$ electrode. The first phase information may be recorded on the first pixel area P11 by applying a first voltage to the 1-1$^{th}$ electrode WL1 from among the plurality of first electrodes WL1 through WLn and applying a second voltage to the 2-1$^{th}$ electrode BL1 from among the plurality of second electrodes BL1 through BLn. The first voltage and the second voltage may have the same polarity. For example, the first voltage may be +1V, and the second voltage may be +1V. A magnitude of the first voltage and a magnitude of the second voltage are merely examples, and may be changed. A reference voltage, for example, a ground voltage GND (0V), may be applied to the first active layer member AL1 from among the plurality of active layer members AL1 through ALn.

A voltage having a polarity opposite to that of the second voltage applied to the 2-1$^{th}$ electrode BL1 may be applied to remaining first electrodes WL2 through WLn other than the 1-1$^{th}$ electrode WL1. For example, a voltage of −1V may be applied to the remaining first electrodes WL2 through WLn. Accordingly, states of pixel areas between the 2-1$^{th}$ electrode BL1 and the remaining first electrodes WL2 through WLn may not be substantially changed.

Remaining active layer members AL2 through ALn other than the first active layer member AL1 may be electrically floated. Accordingly, states of pixel areas corresponding to the remaining active layer members AL2 through ALn may not be substantially changed.

If necessary, a voltage having a polarity opposite to that of the first voltage applied to the 1-1$^{th}$ electrode WL1 may be applied to remaining second electrodes BL2 through BLn other than the 2-1$^{th}$ electrode BL1. For example, a voltage of −1V may be applied to the remaining second electrodes BL2 through BLn. States of pixel areas between the 1-1$^{th}$ electrode WL1 and the remaining second electrodes BL2 through BLn may not be substantially changed.

The method described with reference to FIG. 11 is a method used when an upper capacitance and a lower capacitance of a predetermined pixel area are the same. In this case, voltages applied to upper and lower portions in order to maintain a state of a pixel area may have opposite polarities (i.e., +1V and −1V) and the same magnitude (the same absolute value). However, when the upper capacitance and the lower capacitance are different from each other, magnitudes (absolute values) of voltages applied to the upper and lower portions in order to maintain a state of a pixel area may be different from each other. That is, magnitudes (absolute values) of applied voltages may be changed according to the upper capacitance and the lower capacitance of the pixel area. The above description also applies to the descriptions regarding FIGS. 12 and 13.

A method of recording second phase information on the second pixel area P21 from among the plurality of pixel areas P11, P21, P31, P12, P13, P22, . . . , and Pnn will be described with reference to FIG. 12.

The second phase information may be recorded on the second pixel area P21 by applying a third voltage to the 1-2$^{th}$ electrode WL2 from among the plurality of first electrodes WL1 through WLn and applying a fourth voltage to the 2-1$^{th}$ electrode BL1 from among the plurality of second electrodes BL1 through BLn. The third voltage and the fourth voltage may have the same polarity. For example, the third voltage may be +2V, and the fourth voltage may be +2V. A magnitude of the third voltage and a magnitude of the fourth voltage are merely examples, and may be changed. The second phase information recorded on the second pixel area P21 may be different from the first phase information recorded on the first pixel area P11 of FIG. 11. A reference voltage, for example, a ground voltage GND (0V), may be applied to the first active layer member AL1 from among the plurality of active layer members AL1 through ALn.

A voltage having a polarity opposite to that of the fourth voltage applied to the 2-1$^{th}$ electrode BL1 may be applied to remaining first electrodes WL1 and WL3 through WLn other than the 1-2$^{th}$ electrode WL2. For example, a voltage of −2V may be applied to the remaining first electrodes WL1 and WL3 through WLn. Accordingly, states of pixel areas between the 2-1$^{th}$ electrode BL1 and the remaining first electrodes WL1 and WL3 through WLn may not be substantially changed.

Remaining active layer members AL2 through ALn other than the first active layer member AL1 may be electrically floated. Accordingly, states of pixel areas corresponding to the remaining active layer members AL2 through ALn may not be substantially changed.

If necessary, a voltage having a polarity opposite to that of the third voltage applied to the 1-2$^{th}$ electrode WL2 may be applied to remaining second electrodes BL2 through BLn other than the 2-1$^{th}$ electrode BL1. For example, a voltage of −2V may be applied to the remaining second electrodes BL2 through BLn. States of pixel areas between the 1-2$^{th}$ electrode WL2 and the remaining second electrodes BL2 through BLn may not be substantially changed.

Phase information may be recorded on all of the pixel areas P11, P21, P31, P12, P13, P22, . . . , and Pnn by using the method described with reference to FIGS. 11 and 12. A phase profile may be easily recorded on a plurality of pixel areas that are two-dimensionally arranged by using the plurality of first and second electrodes WL1 through WLn and BL1 through BLn that are arranged to form a cross-point array structure. Also, although the method of recording the first phase information on the first pixel area P11 is described with reference to FIG. 11 and the method of recording the second phase information on the second pixel area P21 is described with reference to FIG. 12, phase information may be simultaneously recorded on two or more pixel areas, if necessary.

A method of removing the first phase information recorded on the first pixel area P11 from among the plurality of pixel areas P11, P21, P31, P12, P13, P22, . . . , and Pnn will now be described with reference to FIG. 13.

In order to remove the first phase information recorded on the first pixel area P11, voltages having polarities opposite to those of voltages applied to the first pixel area P11 to record the first phase information (see FIG. 11) may be applied to the first pixel area P11. For example, the first phase information may be removed (deleted) from the first pixel area P11 by applying a fifth voltage to the 1-1$^{th}$ electrode WL1 from among the plurality of first electrodes WL1 through WLn and applying a sixth voltage to the 2-1$^{th}$ electrode BL1 from among the plurality of second electrodes BL1 through BLn. The fifth voltage may be a voltage having the opposite polarity to and the same magnitude as those of the first voltage of FIG. 11, and the sixth voltage may be a voltage having the opposite polarity to and the same magnitude as those of the second voltage of FIG. 11. In the present embodiment, the fifth voltage may be −1V, and the sixth voltage may be −1V. A reference voltage, for example, a ground voltage GND (0V), may be applied to the first active layer member AL1 from among the plurality of active layer members AL1 through ALn, and remaining active layer members AL2 through ALn may be electrically floated.

A voltage having a polarity opposite to that of the sixth voltage applied to the 2-1$^{th}$ electrode BL1 may be applied to remaining electrodes WL2 through WLn other than the 1-1$^{th}$ electrode WL1, and a voltage having a polarity opposite to that of the fifth voltage applied to the 1-1$^{th}$ electrode WL1 may be applied to remaining second electrodes BL2 through BLn other than the 2-1$^{th}$ electrode BL1. For example, a voltage of +1V may be applied to the remaining first electrodes WL2 through WLn, and a voltage of +1V may be applied to the remaining second electrodes BL2 through BLn.

Figure 14:
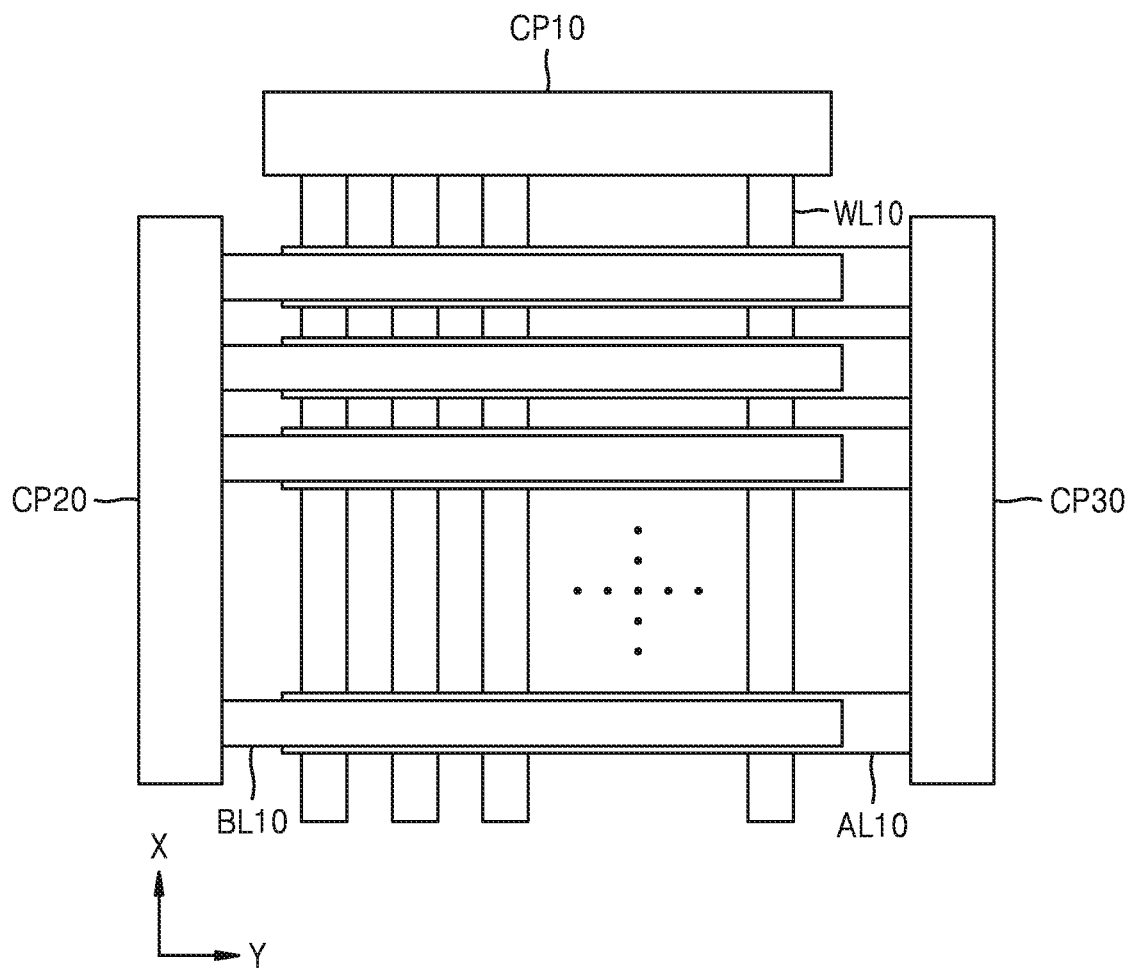
FIG. 14 is a plan view illustrating a configuration of an optical modulation device according to another example embodiment.

FIG. 14 is a plan view illustrating a configuration of an optical modulation device according to another example embodiment.

Referring to FIG. 14, a plurality of first electrodes WL10 may be arranged, a plurality of second electrodes BL10 intersecting the plurality of first electrodes WL10 may be arranged, and a plurality of active layer members AL10 may be provided between the plurality of first electrodes WL10 and the plurality of second electrodes BL10. A first circuit unit CP10 connected to the plurality of first electrodes WL10 may be further provided, a second circuit unit CP20 connected to the plurality of second electrodes BL10 may be further provided, and a third circuit unit CP30 connected to the plurality of active layer members AL10 may be further provided. The first circuit unit CP10 may include a plurality of first driving cells respectively connected to the plurality of first electrodes WL10, and the second circuit unit CP20 may include a plurality of second driving cells respectively connected to the plurality of second electrodes BL10. The third circuit unit CP30 may include a plurality of unit circuits respectively connected to the plurality of active layer members AL10.

Figure 15:
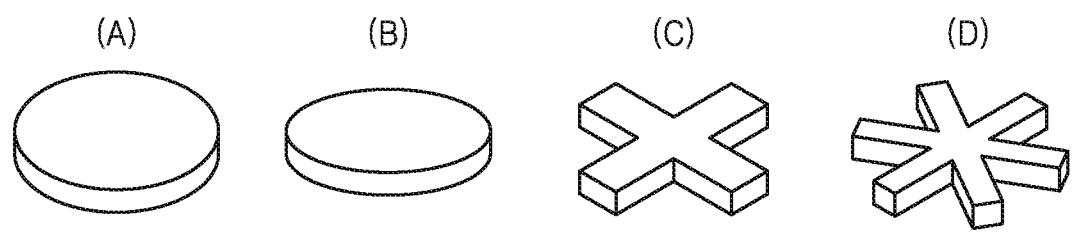
FIG. 15 is a perspective view illustrating various structures/shapes of a unit area of a nano-antenna applicable to an optical modulation device according to example embodiments.

FIG. 15 is a perspective view illustrating various structures/shapes of a unit area of a nano-antenna applicable to an optical modulation device according to example embodiments. The unit area of the nano-antenna may correspond to a pixel area.

Referring to FIG. 15, the unit area of the nano-antenna may have various structures/shapes such as a circular disk type (A), an elliptical disk type (B), a cross type (C), and an asterisk type (D). The cross type (C) may have a shape in which two nano-rods perpendicularly intersect each other, and the asterisk type (D) may have an asterisk (*) shape in which three nano-rods cross one another. The unit area of the nano-antenna may have any of various other modified structures such as a cone type, a triangular pyramid type, a spherical type, a hemispherical type, a rice grain type, a rod type, and a fish-bone type. Also, the nano-antenna may have a multi-layer structure in which a plurality of layers are stacked, or may have a core-shell structure including a core portion and at least one shell portion. In addition, nano-antennas having two or more different structures/shapes may constitute one unit and may be periodically arranged.

A resonance wavelength, a resonance wavelength width, resonance polarization characteristics, a resonance angle, and reflection/absorption/transmission characteristics may be changed according to a structure/type and an arrangement of nano-antennas. Accordingly, an optical modulation device having desired characteristics may be manufactured by controlling a structure/type and an arrangement of nano-antennas.

A device of steering a beam to a predetermined direction may be realized by using an optical modulation device according to any of the embodiments of the present disclosure.

Figure 16:
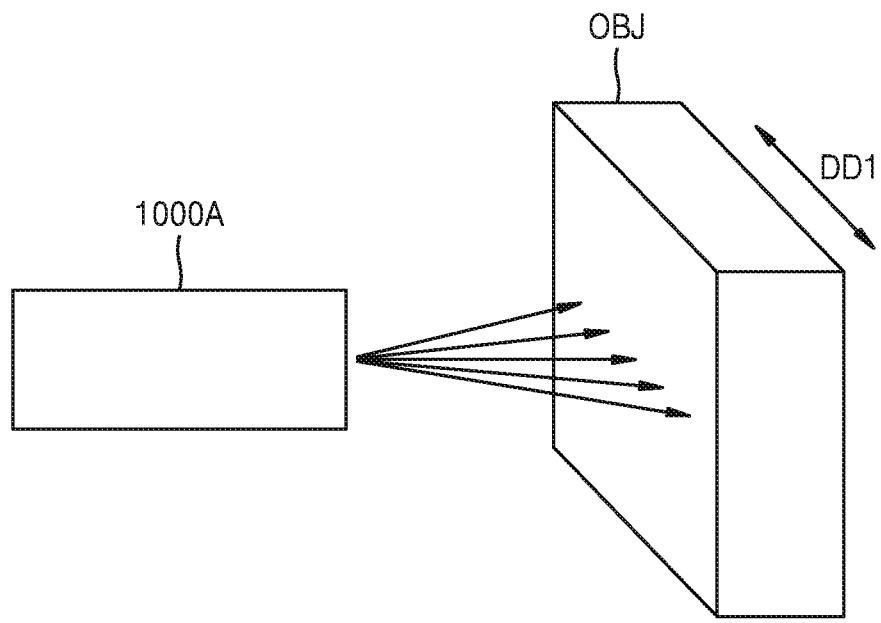
FIG. 16 is a conceptual view for describing a beam steering device including an optical modulation device according to an example embodiment.

FIG. 16 is a conceptual view for describing a beam steering device 1000A including an optical modulation device according to an example embodiment.

Referring to FIG. 16, a beam may be steered to a one-dimensional (1D) direction by using the beam steering device 1000A. That is, a beam may be steered toward a predetermined object OBJ in a first direction DD1. The beam steering device 1000A may include an optical modulation device according to any of the example embodiments of the present disclosure.

Figure 17:
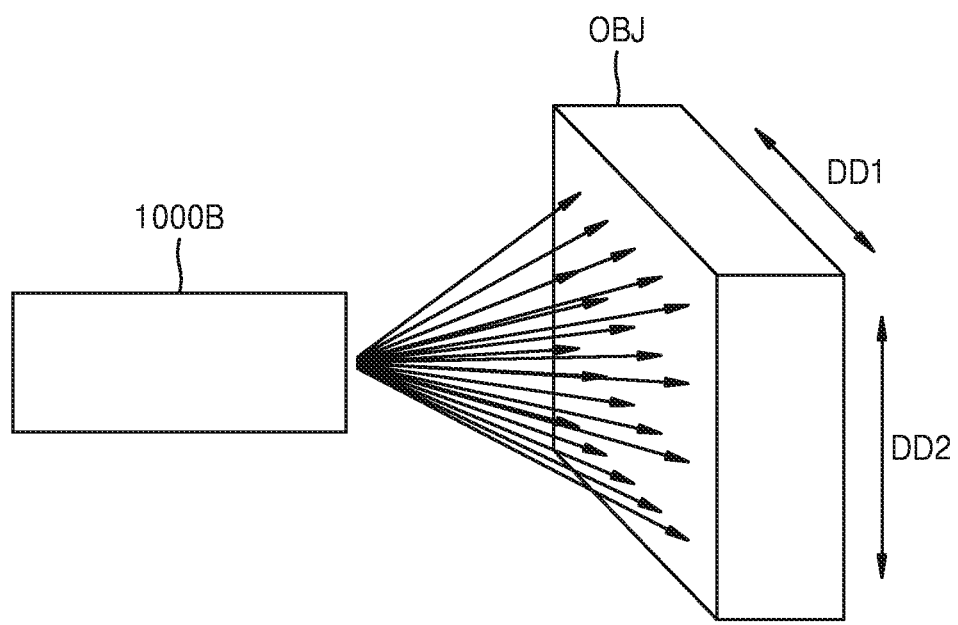
FIG. 17 is a conceptual view for describing a beam steering device including an optical modulation device according to another example embodiment.

FIG. 17 is a conceptual view for describing a beam steering device 1000B including an optical modulation device according to another example embodiment.

Referring to FIG. 17, a beam may be steered to a two-dimensional (2D) direction by using the beam steering device 1000B. That is, a beam may be steered toward the predetermined object OBJ in the first direction DD1 and a second direction DD2 that is perpendicular to the first direction DD1. The beam steering device 1000B may include an optical modulation device according to any of example embodiments of the present disclosure. The beam steering devices 1000A and 1000B of FIGS. 16 and 17 may be non-mechanical beam scanning apparatuses.

Figure 18:
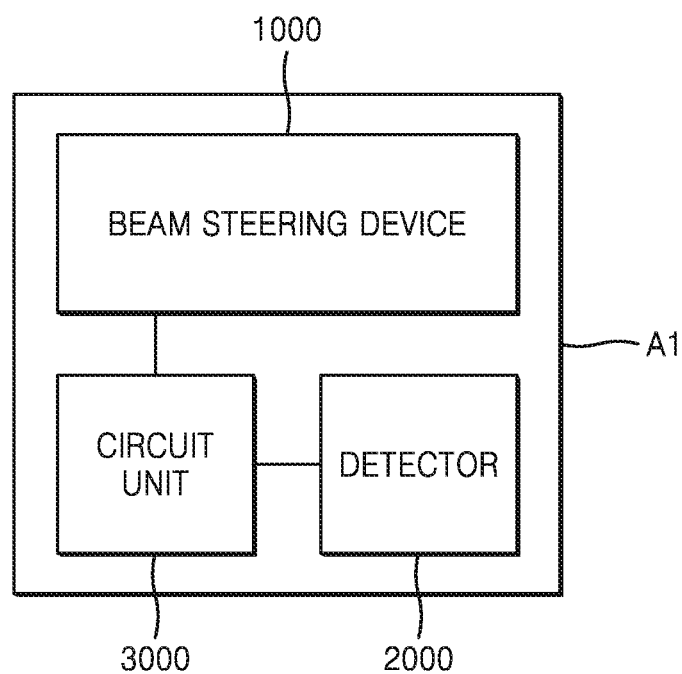
FIG. 18 is a block diagram for describing an overall system of an optical apparatus including a beam steering device using an optical modulation device according to an example embodiment.

FIG. 18 is a block diagram for describing an overall system of an optical apparatus A1 including a beam steering device 1000 using an optical modulation device according to an example embodiment.

Referring to FIG. 18, the optical apparatus A1 may include the beam steering device 1000. The beam steering device 1000 may include the optical modulation device of any of FIGS. 1A through 2B and FIGS. 5 through 15. The optical apparatus A1 may include a light source unit in the beam steering device 1000, or may include a light source unit separate from the beam steering device 1000. The optical apparatus A1 may include a detector 2000 for detecting light steered by the beam steering device 1000 and reflected by an object. The detector 2000 may include a plurality of light detection elements and may further include other optical members. Also, the optical apparatus A1 may further include a circuit unit 3000 connected to at least one of the beam steering device 1000 and the detector 2000. The circuit unit 3000 may further include a processor configured to obtain and calculate and may further include a driver and a controller. Also, the circuit unit 3000 may further include a power supply unit and a memory.

Although the optical apparatus A1 includes the beam steering device 1000 and the detector 2000 in FIG. 18, the beam steering device 1000 and the detector 2000 may be separately provided in apparatuses instead of being provided in one apparatus. Also, the circuit unit 3000 may be connected to the beam steering device 1000 or the detector 2000 through wireless communication, instead of by wire. In addition, the configuration of FIG. 18 may be changed in various ways.

The beam steering device according to the above embodiments may be applied to various optical apparatuses. For example, the beam steering device may be applied to a light detection and ranging (LiDAR) apparatus. The LiDAR apparatus may be an apparatus using a phase-shift method or a time-of-flight (TOF) method. The LiDAR apparatus may be applied to an autonomous vehicle, a flying object such as a drone, a mobile device, a small vehicle (e.g., a bicycle, a motorcycle, a stroller, or a board), a robot, a human/animal assistive device (e.g., a cane, a helmet, an accessory, a garment, a watch, or a bag), an Internet of things (IoT) apparatus/system, and a security apparatus/system.

Figure 19:
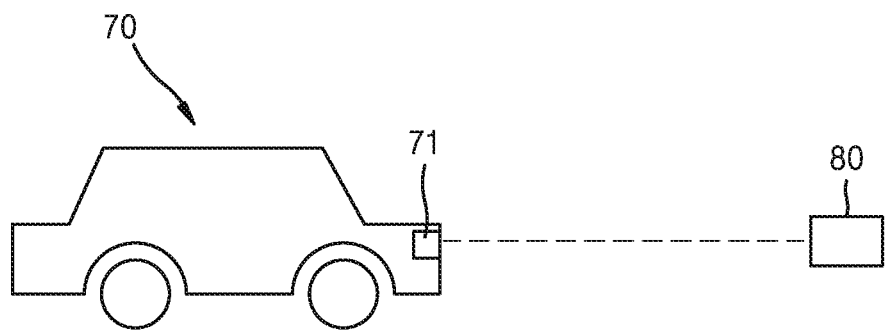
FIGS. 19 and 20 are conceptual views illustrating a case where a light detection and ranging (LiDAR) apparatus including an optical modulation device is applied to a vehicle according to an example embodiment.
Figure 20:
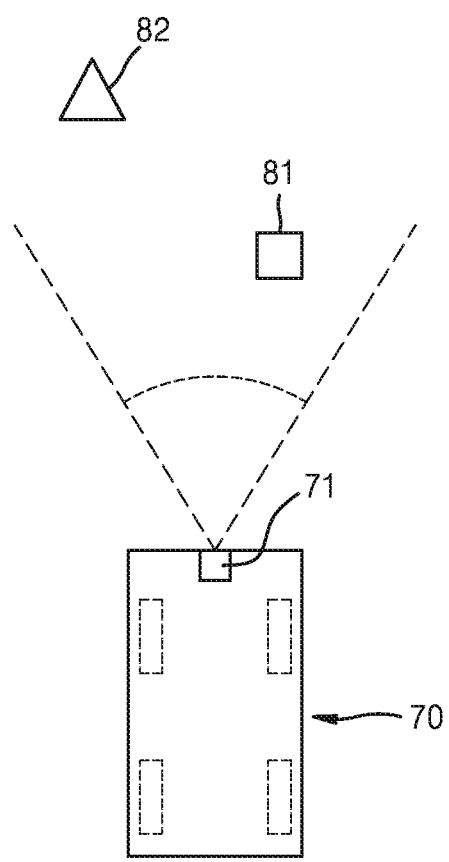

FIGS. 19 and 20 are conceptual views illustrating a case in which a LiDAR apparatus 71 including an optical modulation device is applied to a vehicle 70 according to an embodiment. FIG. 19 is a side view and FIG. 20 is a top plan view.

Referring to FIG. 19, the LiDAR apparatus 71 may be applied to the vehicle 70, and information about an object 80 may be obtained by using the LiDAR apparatus 71. The vehicle 70 may be a vehicle having a self-driving function. The object 80 (e.g., solid matter or a person) located in a direction in which the vehicle 70 travels may be detected by using the LiDAR apparatus 71. Also, a distance to the object 80 may be measured by using information such as a time difference between a transmission signal and a detection signal. Also, as shown in FIG. 20, information about a near object 81 and a far object 82 located within a scan range may be obtained.

The optical modulation device according to various example embodiments of the present disclosure may be applied to various optical apparatuses as well as the LiDAR apparatus. For example, since three-dimensional (3D) information of an object and a space may be obtained through scanning by using the optical modulation device according to various embodiments, the optical modulation device may be applied to a 3D image acquisition apparatus or a 3D camera. Also, the optical modulation device may be applied to a holographic display apparatus and a structured light generating apparatus. Also, the optical modulation device may be applied to various optical components/apparatuses such as various beam scanning apparatuses, hologram generating apparatuses, light coupling apparatuses, variable focal lenses, 3D sensors, and depth sensors. Also, the optical modulation device may be applied to a sensor for autonomous driving and an optical module radar. Also, the optical modulation device may be applied to various fields using a "meta surface" or a "meta structure". In addition, the optical modulation device and the optical apparatus including the same according to embodiments of the present disclosure may be applied to various optical and electronic devices for various purposes.

Although many embodiments have been described in detail, the embodiments should not be construed as limiting the scope of the present disclosure, but rather should be interpreted as examples. The present teaching can be readily applied to other types of apparatuses. Also, the description of the exemplary embodiments is intended to be illustrative, and not to limit the scope of the claims, and many alternatives, modifications, and variations will be apparent to those skilled in the art. For example, it will be understood by one of ordinary skill in the art that the optical modulation device and the method of operating the same described with reference to any of FIGS. 1A through 2B and FIGS. 9 through 20 may be modified in various ways. Also, applications of the optical modulation device according to embodiments are not limited thereto and may be modified in various ways. Accordingly, the scope of the present disclosure is defined not by the embodiments but by the technical sprit and scope of the following claims.

What is claimed is:

1. An optical modulation device comprising:
a mirror area comprising a plurality of mirror members each of which linearly extend in a first direction;
a nano-antenna area facing the mirror area, and comprising a plurality of nano-antennas each of which linearly extend in a second direction that is perpendicular to the first direction, to form a plurality of intersections between the plurality of mirror members and the plurality of nano-antennas that correspond to a plurality of pixel areas;
an active area located between the mirror area and the nano-antenna area that are stacked in a third direction perpendicular to the first direction and the second direction, and having a physical property that varies according to an electrical condition to non-mechanically modulate light,
wherein electrical signals are applied to the plurality of mirror members and the plurality of nano-antennas to change the physical property of the active area located between the plurality of mirror members and the plurality of nano-antennas to non-mechanically modulate light.

2. The optical modulation device of claim 1, wherein the plurality of mirror members have linear shapes, and operate as a plurality of first electrodes.

3. The optical modulation device of claim 1, wherein the plurality of nano-antennas have linear shapes, and operate as a plurality of second electrodes.

4. The optical modulation device of claim 1, further comprising a plurality of first driving cells that are connected to the plurality of mirror members.

5. The optical modulation device of claim 1, further comprising a plurality of second driving cells that are connected to the plurality of nano-antennas.

6. The optical modulation device of claim 1, further comprising:
a first insulating layer located between the mirror area and the active area; and
a second insulating layer located between the nano-antenna area and the active area.

7. The optical modulation device of claim 1, further comprising:
a plurality of first driving cells respectively connected to the plurality of mirror members and configured to apply voltages to the plurality of mirror members; and
a plurality of second driving cells respectively connected to the plurality of nano-antennas and configured to apply voltages to the plurality of nano-antennas.

8. The optical modulation device of claim 1, wherein the active area comprises a plurality of active layer members, the plurality of active layer members have linear shapes that extend in the first direction or the second direction.

9. The optical modulation device of claim 1, wherein the active area comprises an electro-optic material having a permittivity that varies according to the electrical signals applied to the active area.

10. The optical modulation device of claim 1, wherein the active area comprises at least one of a transparent conductive oxide (TCO) and a transition metal nitride (TMN).

11. The optical modulation device of claim 1, wherein the optical modulation device is configured to induce phase modulation of light reflected by the nano-antenna area.

12. An optical apparatus comprising the optical modulation device of claim 1, and configured to steer a beam by using the optical modulation device.

13. The optical apparatus of claim 12, wherein the optical apparatus comprises at least one of a light detection and ranging (LiDAR) apparatus, a three-dimensional (3D) image acquisition apparatus, a 3D sensor, and a depth sensor.

14. The optical modulation device of claim 1,
wherein the plurality of mirror members operate as plurality of first electrodes and the plurality of nano-antennas operates as second electrodes to change the physical property of the active area to non-mechanically modulate light.

15. The optical modulation device of claim 14, wherein the plurality of mirror members are disposed to be apart from the plurality of nano-antennas in the third direction.

16. The optical modulation device of claim 15, further comprising:
a first insulating layer located between the mirror area and the active area; and
a second insulating layer located between the nano-antenna area and the active area.

17. The optical modulation device of claim 15, further comprising:
a first insulating layer located between the plurality of first electrodes and the active area; and
a second insulating layer located between the plurality of second electrodes and the active area.

18. A method of operating an optical modulation device of claim 1, wherein a plurality of pixel areas of the active area corresponding to intersections between the plurality of first electrodes and the plurality of second electrodes, the method comprising:
recording phase information of at least one pixel area selected from among the plurality of pixel areas, by using the plurality of first electrodes and the plurality of second electrodes; and
modulating a light that is incident on the optical modulation device and reflected by the nano-antenna area.

19. The method of claim 18, wherein the recording the phase information comprises recording first phase information on a first pixel area at an intersection between a first sub-electrode of the plurality of first electrodes and a first-sub electrode of the plurality of second electrodes by applying a first voltage to the first sub-electrode of the plurality of first electrodes and applying a second voltage to the first sub-electrode of the plurality of second electrodes, wherein the first voltage and the second voltage have a same polarity.

20. The method of claim 19, wherein the recording the first phase information further comprises applying a third voltage to a second sub-electrode of the plurality of first electrodes,
wherein the third voltage has a polarity opposite to the polarity of the second voltage.

21. The method of claim 19, wherein the recording the first phase information further comprises applying a fourth voltage to a second sub-electrode of the plurality of second electrodes,
wherein the fourth voltage has a polarity opposite to the polarity of the first voltage.

22. The method of claim 18, further comprising maintaining a state of at least one pixel area that is not selected from the plurality of pixel areas while recording the phase information of the at least one pixel area selected from the plurality of pixel areas.

23. The method of claim 18, wherein the active area comprises a plurality of active layer members,
wherein the recording the phase information further comprises applying a reference voltage to at least one active layer member selected from among the plurality of active layer members, while at least one active layer member that is not selected from among the plurality of active layer members is electrically floated.

24. The method of claim 18, further comprising removing the phase information recorded on the at least one pixel area selected from among the plurality of pixel areas, by using the plurality of first electrodes and the plurality of second electrodes.

* * * * *